United States Patent
Gros

(10) Patent No.: US 7,312,255 B2
(45) Date of Patent: Dec. 25, 2007

(54) WATER-BASED COATING MIXTURE, METHOD FOR APPLICATION OF CORROSION PROTECTION LAYER WITH SAID MIXTURE, SUBSTRATES COATED THUS AND USE THEREOF

(75) Inventor: Georg Gros, Oppenau (DE)

(73) Assignee: Chemetall GmbH, Frankfurt am Main (DE)

( * ) Notice: Subject to any disclaimer, the term of this patent is extended or adjusted under 35 U.S.C. 154(b) by 258 days.

(21) Appl. No.: 10/467,927

(22) PCT Filed: Mar. 2, 2002

(86) PCT No.: PCT/EP02/02261

§ 371 (c)(1), (2), (4) Date: Oct. 30, 2003

(87) PCT Pub. No.: WO02/070616

PCT Pub. Date: Sep. 12, 2002

(65) Prior Publication Data

US 2004/0115438 A1    Jun. 17, 2004

(30) Foreign Application Priority Data

Mar. 5, 2001   (DE) ............... 101 10 450
Aug. 31, 2001  (DE) ............... 101 42 687

(51) Int. Cl.
C08F 2/46   (2006.01)
C08F 2/50   (2006.01)

(52) U.S. Cl. .............. 522/85; 522/84; 522/86; 522/71; 522/74; 522/81; 522/90; 522/96; 522/92; 522/100; 522/170; 522/174; 522/113; 522/114; 522/116; 522/120; 522/121; 522/150; 522/152; 522/173

(58) Field of Classification Search .......... 522/84, 522/85, 86, 71, 74, 81, 90, 96, 92, 100, 104, 522/107, 174, 113, 114, 120, 121, 116, 150, 522/152, 173
See application file for complete search history.

(56) References Cited

U.S. PATENT DOCUMENTS

| | | | |
|---|---|---|---|
| 4,628,004 A | 12/1986 | Nickola et al. | |
| 5,501,942 A * | 3/1996 | Salvin et al. | 430/280.1 |
| 6,001,469 A | 12/1999 | Verardi et al. | |
| 6,146,706 A | 11/2000 | Verardi et al. | |
| 6,332,291 B1 * | 12/2001 | Flosbach et al. | 522/91 |
| 6,605,669 B2 * | 8/2003 | Awokola et al. | 525/123 |
| 6,716,891 B1 * | 4/2004 | Meisenburg et al. | 522/90 |
| 6,740,365 B2 * | 5/2004 | Awokola et al. | 427/512 |
| 6,794,422 B1 | 9/2004 | Bruchmann et al. | |
| 6,855,403 B2 * | 2/2005 | Tysak | 428/212 |
| 2002/0088373 A1 | 7/2002 | Marten | |
| 2003/0143078 A1 * | 7/2003 | Benedetto et al. | 416/219 R |
| 2003/0175541 A1 | 9/2003 | Lorenz et al. | |
| 2003/0212163 A1 * | 11/2003 | Awokola et al. | 522/150 |
| 2003/0224195 A1 * | 12/2003 | Tysak | 428/515 |

FOREIGN PATENT DOCUMENTS

| | | |
|---|---|---|
| AU | 742771 | 5/1999 |
| DE | 3727112 A1 | 2/1989 |
| DE | 198 18 735 A1 | 10/1999 |
| DE | 199 47 522 A1 | 4/2001 |
| EP | 0 104 838 A2 | 4/1984 |
| EP | 0 742 239 A | 11/1996 |
| JP | 50-045740 A | 4/1975 |
| JP | 57-192405 A | 11/1982 |
| WO | 89/05476 * | 6/1989 |
| WO | WO-97/35937 A1 | 10/1997 |
| WO | WO0073395 * | 12/2000 |
| WO | WO-01 23453 A | 4/2001 |
| WO | WO-01/30923 A2 | 5/2001 |

* cited by examiner

Primary Examiner—Sanza L. McClendon
(74) Attorney, Agent, or Firm—Fulbright & Jaworski L.L.P.

(57) ABSTRACT

The invention relates to a mixture for the application of a polymeric coating to a substrate. Said mixtures comprises water and optionally an organic solvent, at least one water-dispersible radically polymerizable compound, at least one water-dispersible polymerizable crosslinking compound and at least one water-dispersible compound which forms free radicals upon exposure to actinic radiation. The radically polymerizable compound cannot fully set with the free radicals formed on irradiation at room temperature, but rather comprises further reactive bonds, which lead to further or complete setting with the crosslinking compound. The invention further relates to a method for application of a non-adhesive corrosion protection layer to a substrate, by application of a mixture to the surface of a metallic or polymeric substrate, drying the mixture and irradiation of the applied coating with actinic radiation of such an intensity and for such a period that a solid, hard, tough coating is formed.

16 Claims, No Drawings

WATER-BASED COATING MIXTURE, METHOD FOR APPLICATION OF CORROSION PROTECTION LAYER WITH SAID MIXTURE, SUBSTRATES COATED THUS AND USE THEREOF

The present invention relates to a mixture for the application of a polymeric coating to a substrate, wherein the mixture contains water and optionally also organic solvent as well as at least one free-radically polymerisable compound. The invention relates in particular to a mixture for the application of a UV-hardenable, weldable anticorrosion layer to a metallic substrate, a process for the application of a slideable (non-friction) anticorrosion layer, as well as a substrate coated in this way, in particular a metal sheet.

Weldable protective coatings of the aforementioned type based on inorganic pigment particles and organic polymers are known and are described for example in DE-C 34 12 234 for electrolytically thin-galvanised, ductile, phosphated and chromated steel sheet. The anticorrosion primer consists of a mixture of 70% to 95% zinc, aluminium, graphite and/or molybdenum sulfide and anticorrosion pigments as well as 5% to 30% of an organic binder and optionally additives, referred to the dry film. The organic binder is based on polyester resin and/or epoxide resin.

EP-B 0 298 409 discloses such coatings for steel sheet, which comprise a layer of pyrogenic silicic acid and a hardened organic matrix that has been obtained from an epoxide resin and a polyvalent isocyanate by thermal crosslinking. This coating is applied to an insoluble chromate film that in turn is applied to the steel coated with a layer based on aluminium and/or zinc.

EP-B 0 344 129 discloses similar coatings with a thickness of up to 2 μm, which have been obtained by the hardening of epoxide resins having an epoxy equivalent between 500 and 2000 by means of amines, melamines, phenolic resins and/or the like.

In EP-A 0 761 320 coated steel sheets are described that carry an organic protective layer that has been produced by electrolytic polymerisation of ionogenic polymerisable organic compounds from aqueous solution.

In EP-A 0 659 855 an aqueous coating mixture is described from which hardenable rust prevention coatings can be deposited. The mixture contains at least one water-soluble alkyd resin and at least one water-soluble acrylic resin, which in each case has an acid value of 25 to 100, a hydroxyl value of 35 to 200 and an SP value of 10 to 11, as well as a hardener selected from oxazoline compounds and melamine resins and at least one acidic catalyst.

All these known coating mixtures are thermally hardened, a permanent resistance to chemicals and weathering influences as well as a sufficient rust prevention being achieved. The thermal hardening has the disadvantage of a high energy consumption. The temperature of the substrates (=supports) is for the hardening generally in the range from 140° to 250° C.

On account of the high temperatures during hardening the coatings produced in this way are less elastic than those that have been subjected to lower temperatures. Accordingly the substrates, such as for example steel sheets, that have been provided with an organic coating thermally hardened at high temperature are ductile only to a limited extent, for example by deep drawing or edging. For this purpose a treatment with drawing oil is generally necessary, which could however be omitted if the coatings had a higher elasticity. The necessary high hardening temperatures may also lead to structural changes in the substrate.

The known coating mixtures often contain zinc powder. Such mixtures tend to undergo corrosion, which occurs between the pigmented layer and the metallic, optionally galvanised substrate. In addition, in order to achieve a weldable coating for electric welding a content of electrically conducting constituents is necessary, which ensures the minimum electrical conductivity necessary for welding.

WO 00/75250 in the name of the Applicants discloses a UV-hardenable coating mixture with anticorrosion properties. The mixture is suitable in particular for the coating of steel strip or sheeting that has been galvanised and/or chromated. Such materials are generally used in the automobile industry. The coating mixture contains a polymeric organic binder, a low molecular weight, liquid, free-radically polymerisable compound, a compound forming free radicals under the action of actinic radiation and, as conducting pigment, an oxide, phosphate and/or phosphide of iron or aluminium or graphite-mica pigments. The binder is selected from the group comprising condensation resins, epoxy resins, poly(methyl)acrylates, polyurethanes, polyesters and polyethers, preferably epoxidised novolaks, bisphenol-epichlorohydrin condensation products and esterification products of these resins or polymers with (meth)acrylic acid. The free-radically polymerisable compound is a mixture of compounds, at least some of which contain more than one polymerisable group in the molecule, or consist wholly of these, preferably esters of an $\alpha$, $\beta$-unsaturated carboxylic acid, preferably acrylic acid or methacrylic acid, with a dihydric or polyhydric monomeric or oligomeric alcohol. The mixtures are preferably free of organic solvents and water. The organic coatings that are obtained can readily be formed and welded after the UV hardening, and provide an outstanding corrosion protection.

They have the disadvantage however that the hardening has to be carried out largely or even wholly with actinic radiation. This requires—in particular for strip plants that operate at high speed—a very high expenditure on plant technology and energy use. At the present time the speed of strip plants in which the hardening is to be carried out largely or wholly by UV radiation is restricted to speeds of up to about 60 or up to about 80 m/min. The investment expenditure is extremely high.

Whereas the steel sheets for the coating of which the mixtures described hereinbefore have been developed have up to now generally been chromated in order to achieve a better corrosion resistance, this procedure is increasingly being discontinued for environmental reasons. It is assumed that sheets that have been pretreated in a chromium-free manner will be used practically exclusively in the near future, at least in the automobile industry.

Such non-chromated metallic substrates, for example steel strip or steel sheets, require in some cases, as has now been shown, a relatively high thickness of the layer applied thereto in order to ensure the same corrosion resistance as in chromated sheets. The dry film layer thickness of the polymeric coating that is applied to the pretreatment coating must then according to the prior art have a thickness in the range from 4 to 10 μm, whereas the coating in the case of chromated substrates according to the prior art need only have a thickness in the range from 2 to 4 μm.

The coating mixtures available up to the present time are however often formulated for the layer thicknesses necessary in the case of chromated metallic substrates. In this connection, having regard to weldability, the amount of conducting pigment that is present is in general also appropriately adapted to the layer thicknesses required for chromated steel. The conductivity can of course in principle be adapted to the requirements pertaining to high layer thicknesses simply by adding a larger amount of pigment. Cases arise however, in particular with regard to the composition and properties of finely matched coating mixtures, in which the amount of pigment required to achieve the desired weldability can no longer be added. The reasons for this may be a viscosity that rises to too high values, a decrease in the reactivity, or the occurrence of inhomogeneities up to the formation of agglomerates. In such cases a change in the composition of the mixtures is often unavoidable.

There is thus a need for coating mixtures which, apart from the desired properties of UV-hardenable coating mixtures outlined above, enable high layer thicknesses combined with good weldability to be achieved without the composition possibly having to be altered.

Furthermore in particular coating mixtures are desired by steel manufacturers that permit a complete treatment and coating of the steel or steel sheet subsequently delivered to the further processing plants, without interruption in a production unit. Up to now the steel strips and sheets are generally galvanised and if desired chromated at the manufacturer's after completion of the rolling process, and are then wound into rolls. The rolls of metallic strip obtained in this way (coils) are then transported to the coating unit, where the polymer-containing coating is applied. The transportation to the coating unit as well as the uncoiling and coiling of the roll represent undesirable cost factors that should be avoided.

A UV-hardenable coating mixture is desired that enables the pretreatment and the coating with a polymer-containing coating to be carried out in a single production unit (so-called inline process). For this purpose special requirements are placed on the hardenability of the coating mixture. The galvanising of a steel sheet is generally carried out at speeds starting from ca. 120 m/min. In order to ensure a problem-free procedure without intermediate storage, the coating including the hardening must likewise be executed at such speeds. For this reason coating mixtures are required that permit a coating at these high speeds and in which the resultant layer has a sufficient hardness.

The object of the present invention is to provide coating mixtures having the properties mentioned above as regards weldability and hardenability. Furthermore these coating mixtures should also be suitable for application in high-speed strip plants. The coating mixtures should in addition be free as far as possible of heavy metals and should be able to be applied to pretreatment coatings that are as far as possible free of chromium. Finally, the object of the invention is to provide a suitable process for the application of such coating mixtures that permits the outstanding properties to be achieved in a reliable and reproducible manner.

This object is achieved by a mixture for the application of a polymeric coating to a substrate, wherein the mixture contains water and optionally also organic solvent as well as at least one water-dispersible, free-radically polymerisable compound, at least one water-dispersible polymerisable post-crosslinking compound and at least one water-dispersible compound that forms free radicals under the action of actinic radiation, wherein the free-radically polymerisable compound may not harden completely at room temperature with the free radicals formed under the action of the actinic radiation, but also contains reactive bonds that in contact with the post-crosslinking compound lead to a major or complete hardening.

This object is also achieved by a mixture for the application of an anticorrosion layer to a metallic substrate, said mixture containing water and optionally also organic solvent, at least one free-radically polymerisable binder, at least one compound that forms free radicals under the action of actinic radiation, at least one electrically conducting substance such as for example a pigment, and at least one post-crosslinking compound.

Under the action of actinic radiation the at least one photoinitiator forms free radicals that react with the free-radically polymerisable binder and incompletely crosslink the latter during and possibly shortly after the so-called UV hardening. After this chemical reaction this binder may still contain reactive groups such as OH and polyol groups, which may limit the chemical resistance and the corrosion resistance of the coating formed therefrom.

It has now been found that it is very advantageous if there is added to the binder mixture a post-crosslinking compound that after a UV hardening saturates the bonds, not all of which are free, and permits a subsequent chemical hardening to effect a major or complete crosslinking. This frequently occurs through polyaddition. The post-crosslinking compound may largely or wholly chemically harden the free-radically polymerisable binder, which is only partially hardened, in that it bonds with the reactive groups of the UV-hardened binder and thereby significantly increases the corrosion resistance of the hardened polymer.

This object is furthermore achieved by a process for the application of a slideable anticorrosion layer to a substrate, in which a mixture is applied to the surface of a metallic or polymeric substrate, preferably to an uncoated or coated steel strip or steel sheet or to a plastics part, wherein the mixture is dried and the applied coating is irradiated for a sufficient time with actinic radiation of such an intensity that a solid, hard, viscoplastic coating is formed.

This solid, hard, viscoplastic layer normally also becomes slightly more solid and slightly less viscoplastic in the post-crosslinking. This coating can also often still be shaped, even if in some cases with a lesser shaping intensity. Due to the post-crosslinking this coating however acquires in particular a better resistance to organic solvents, to dissolved alkalis and other aggressive chemical substances, as well as a significantly improved corrosion resistance.

The term "water-dispersible" within the context of the present invention is understood to denote everywhere in this text the generic term "water-dispersible", "water-soluble", "water-miscible" and "water-dilutable". Preferably substantially all organic compounds that are added to the mixture or that are contained in this mixture before the crosslinking are water-dispersible. Preferably only or virtually only the electrically conducting compounds and possibly anticorrosion pigments as well as possibly individual further additives are not dispersible in water according to the generic term defined above.

A very wide range of metallic and polymeric substrates can be coated with the coating mixture according to the invention containing water and optionally organic solvent(s) and with the process according to the invention, namely metal sheets, panels, strip materials, profiles, cut sections, wires, moulded articles, in each case in the uncut or cut/stamped state and in the unformed or deformed/formed state, before and/or after joining, for example by clinching, bonding, welding, etc. This coating mixture and this process are particularly preferred for strip materials and wires that are to be coated at high speeds since a partial crosslinking can be achieved very quickly in this way.

As metallic substrates in principle all types of metallic materials are suitable, in particular steels, stainless steels, metallic materials provided with zinc-containing and/or aluminium-containing coatings, aluminium and aluminium alloys, magnesium alloys, magnesium alloys, copper and copper alloys, brass, bronze, nickel alloys, titanium alloys, zinc alloys and tin alloys.

In principle all plastics surfaces, sheet-type surfaces and paint surfaces are suitable as polymeric substrates. These include for example plastics panels, plastics moulded parts, panels and moulded parts, in particular for furniture, in building and construction, in apparatus fabrication, in vehicle production and in the aerospace industry. The electrically conducting coating according to the invention may in this connection be used, in particular after earthing the coating, to prevent a build-up of electrostatic charge on the polymeric components or surfaces.

The coating procedure with the polymer-containing coating mixture according to the invention preferably takes place after a pretreatment with an aqueous composition largely or wholly free of chromium (VI) compounds, particularly preferably also largely or wholly free of additives containing heavy metals, such as for example those based on cadmium, cobalt, copper and/or nickel.

The polymer-containing coating according to the invention is also preferably largely or wholly free of chromium (VI) compounds, particularly preferably also largely or wholly free of additives containing heavy metals, such as for example those based on cadmium, cobalt, copper and/or nickel.

The coating mixture according to the invention contains water. The water is added to the mixture preferably in the form of an aqueous binder dispersion and/or in the form of fully deionised water. The free-radically polymerisable binder is contained dissolved, diluted and/or dispersed in the mixture. The mixture may also contain at least one organic solvent, preferably in amounts of not more than 30 wt. %, particularly preferably of not more than 15 wt. %, referred to the amount of water. The at least one organic solvent that is used should either be completely soluble in water or water-miscible or water-dilutable. Preferred organic solvents are monohydric or polydric alcohols, esters, glycol ethers and ketones.

The composition according to the invention contains at least one organic binder, in which connection however at least one of the binders must be free-radically polymerisable. If only one organic binder is contained, then the post-crosslinking compound is also contained in capped form. If the post-crosslinking compound is present not in capped form, it is regarded as organic binder. The content of the organic binders—calculated as dry substance in the overall water-containing composition—may lie in the range from 8 to 50 wt. %, preferably in the range from 15 to 35 wt. %. The proportion of the free-radically polymerisable binders—optionally as part of the organic binders and calculated as dry substance in the overall water-containing composition (wet paint)—may lie in the range from 8 to 30 wt. %, a minimum content of 10 wt. % and a maximum content of 25 wt. % being preferred. A minimum content of 12 wt. % and a maximum content of 22 wt. % are particularly preferred.

The weight ratio of the free-radically polymerisable binders to the post-crosslinking binders is preferably in the range from 40:60 to 95:5, particularly preferably in the range from 60:40 to 85:15, referred to the dry weights. The proportion of UV hardening to chemical post-crosslinking is in the same relationship.

The free-radically polymerisable compounds contain unsaturated polymerisable groups that react with the groups formed from the photoinitiators under the action of radiation and that can form a water-insoluble network. The network formed in this way and its water insolubility are also to a certain extent important for the corrosion resistance, in particular to water and to aqueous salt solutions. The binder itself is preferably at least one oligomer, pre-oligomer, polymer, pre-polymer, copolymer or block copolymer. The aforementioned polymerisable groups are then present on the latter and permit further polymerisation with the groups of the post-crosslinking compound. The term "polymer" within the context of the present invention includes the structural forms listed for the binders and mentioned above.

The mixture according to the invention contains at least one free-radically polymerisable compound that comprises free OH and/or polyol groups. Suitable free-radically polymerisable binders are acrylates, methacrylates, epoxy resins, polyurethanes and polyesters dispersible in water, preferably epoxy acrylates, urethane acrylates and acrylic-containing polyesters, in particular epoxy acrylates, urethane acrylates and acrylic-containing polyesters that comprise free OH groups.

The polymerisable groups present in the added free-radically polymerisable binder are preferably ethylenically unsaturated, methylenically unsaturated and/or propylenically unsaturated groups. In order to achieve as good a crosslinking as possible and thus insolubility and resistance of the layer to solvents, chemicals and influence of weathering, at least part of the binder used according to the invention should contain at least two polymerisable groups. Preferred ethylenically unsaturated groups are derived from $\alpha$-, $\beta$-unsaturated carboxylic acids. These carboxylic acid(s) may be bound for example as ester to the binder. Preferred $\alpha$-, $\beta$-unsaturated carboxylic acids are acrylic acid(s) and methacrylic acid(s).

Such oligomers and polymers are in principle known to the person skilled in the art, in particular as regards the free-radically polymerisable binders and the post-crosslinking compounds, as are the oligomers or polymers similar thereto or derived therefrom, which may likewise be used in the process according to the invention. The oligomers may already be present in liquid form without the addition of water and/or organic solvent and contain, apart from the resin, also plasticisers, while the polymers are often present in solid form as substantially pure, in many cases soft resin.

The coating mixtures according to the invention may be one-component mixtures, in other words they contain only a binder and are thus present in the form of a mixture of all the necessary constituents if the post-crosslinking compound is capped. It is preferred if the coating mixtures according to the invention are available in the form of two-component mixtures, in other words containing two different binders. The first component (A) may contain all or almost all constituents, for example except for the post-crosslinking compound (free-radically polymerising binder, etc.); the second component (B) may then contain the post-crosslinking compound. The component B is preferably introduced into the component A by stirring, before the processing, and is intimately mixed with the latter, for example by stirring. Three or more components may however also be combined in a similar way.

Preferably the coating mixture is chosen and the process according to the invention is adjusted so that the so-called UV hardening and possibly also at the same time a chemical post-crosslinking are initiated by the actinic radiation. In this application, for the sake of simplicity actinic radiation is termed UV radiation and the crosslinking resulting therefrom is termed UV hardening, since in most cases actinic radiation is the main component of the radiation. Whereas UV hardening under powerful UV radiation leads in 0.5 to 100 seconds, preferably in 0.8 to 60 seconds and in particular in 1 to 5 seconds, to a major crosslinking of the UV-hardenable constituents, the chemical crosslinking that may possibly simultaneously occur requires a very much longer time, generally hours or up to ca. 10 days depending on the proportions and types of the crosslinkable compounds, layer thicknesses and temperatures employed, in order to achieve a major to complete crosslinking of all the crosslinkable compounds. The chemical post-crosslinking can be accelerated or intensified by heating. Since coated steel strips are often coiled in the hot state at a temperature of about 40° C., the heat in the coil is stored for an even longer time and may lead to a quicker and to a more complete post-crosslinking. The chemical crosslinking that is possibly accelerated or intensified by elevated temperatures is referred to as post-crosslinking in the present Application.

If the post-crosslinking compound is present in capped form, it must first of all be heated to a temperature above the capping temperature, which mainly lies in the range from 75° to 150° C., in order to bring the capped compound into a reactive state. By means of the capping it is possible to prepare a paint that is not permanently crosslinking and is stable on storage, which without capping would already react further within a few hours at room temperature. At the desired point in time the capped, post-crosslinking compound can be activated by heating at least to the capping temperature and the post-crosslinking can be initiated.

The post-crosslinking binders may be those based on aliphatic and/or aromatic isocyanate, in particular diisocyanate or polyisocyanate or cyanurate, wherein the isocyanate or isocyanurate terminal groups may optionally be blocked (=capped) by a blocking agent known per se. Depending on their nature, the blocking agents may be caused to dissociate at specific minimum temperatures approximately for example in the range from 75° to 160° C., so that the dissociated reactive groups can react further. This can serve for the intermediate storage of UV-hardened substrates such as for example coils before further processing, before further processing after forming, or before painting over, bonding and/or welding.

The proportion of UV hardening in the overall hardening/ crosslinking is preferably in the range from 90% to 30%, particularly preferably in the range from 85% to 35% and most particularly preferably in the range from 75% to 45%. The remaining proportion of the crosslinking is chemical in nature, even if it can be thermally intensified or accelerated.

If the post-crosslinking compound(s) are all present in capped form, then post-crosslinking cannot be started by the UV radiation, since for this purpose the heating is not sufficient to reach the capping temperature. Accordingly it is possible in automated production lines and on high-speed conveyor belts to apply coatings according to the invention that are first of all hardened by UV radiation but are nevertheless present incompletely crosslinked. The coated substrates can be stored in this state, or may be followed by further process steps, such as for example a forming, since the UV-hardened coating may be so flexible that it can be deformed without damaging the polymeric coating, also when lying on a metallic substrate. The coated substrates may then—for example after storage or forming—be heated at least to the capping temperature, so that the post-crosslinking compounds become reactive and the chemical post-crosslinking is initiated.

An important component of the coating mixture according to the invention is the at least one post-crosslinking compound. This serves to achieve a major or even complete hardening of the mixture according to the invention after the UV hardening. On account of relatively high proportions of this post-crosslinking it is possible to increase significantly the strip speed during UV hardening, since only a minor proportion of all crosslinkable compounds are to be hardened and since the proportion of the crosslinkable compounds in the coating layer according to the invention is relatively slight. In general the strip speed when changing over from an (almost) pure UV hardening to a mixed crosslinking according to the invention can be increased by ca. 10 to 70%, preferably by ca. 20 to 50%, in particular by ca. 30 to 40% with a constant lamp output.

It is therefore possible to effect only part of the crosslinking by UV hardening and subsequently to effect a gradual post-crosslinking possibly extending over about 12 days. The post-crosslinking may extend over several days at room temperature and may be accelerated by elevated temperature and/or in the presence of a catalyst for the post-crosslinking compound, such as for example dibutyltin laurate (DBTL). The post-crosslinking is initiated in the case of post-crosslinking compounds present in uncapped form by the input of heat during the actinic irradiation, since the polymeric layer is thereby heated to temperatures in the range from 60° to 95° C., in particular in the range from 70° to 85° C.

The post-crosslinking compound effects a post-crosslinking of the coating mixture by a thermally initiated reaction. After the coating of the metallic substrates followed by a heat treatment in order to evaporate the water and by the UV irradiation, the metallic substrate generally has a temperature of up to 80° C. The post-crosslinking then takes place.

The at least one post-crosslinking compound is generally selected so that this can react with compounds or functions that are present in the polyol-based binder used according to the invention and can be activated by isocyanate or isocyanurate. As polyols there are preferred compounds based on acrylate, methacrylate, epoxide, polyurethane and polyester, in particular epoxy acrylates, urethane acrylates and acrylic-containing polyesters. The compounds or functions may also be those that are present in the binder mixture according to the invention, for example in order to establish a desired solubility or viscosity. The compounds or functions may also in addition be added to the coating mixture in order to permit the crosslinking.

An important feature of the post-crosslinking compound is its solubility, dilutability and/or dispersibility in water.

Examples of preferred post-crosslinking compounds include isocyanates and isocyanurates. These may be based on 2,4-toluenediisocyanate or 2,6-toluenediisocyanate (TDI), 4,4'-methylenedi(phenyl)isocyanate (MDI) or hexamethylenedi-isocyanate (HDI). Isocyanates and isocyanurates based on HDI are preferably used. The post-crosslinking compounds react with the free OH and polyol groups of the UV hardening resin with the formation of polyureas, which as is known are very stable compounds, and related chemical compounds.

An example of functions and compounds that react in the post-crosslinking stage with the post-crosslinking compound used according to the invention are hydroxyl groups, for example in polyhydric alcohols, polyether alcohols or polyester alcohols. The alcohols, in particular polyether alcohols and polyester alcohols, are preferably of oligomeric and/or polymeric nature.

The hydroxyl groups are preferably chemically bound to the binder, for example directly or via the organic skeleton of the aforementioned alcohols.

The hydroxyl contents of the free-radically hardening binders are often 0.2 to 2% after the UV hardening. The molecular weights of the free-radically hardening binder may, before the UV hardening, be predominantly in the range from 500 to 20,000, and after the UV hardening predominantly in the range from 20,000 to 100,000 and after the post-crosslinking in most cases predominantly at least 100,000.

According to a preferred embodiment of the present invention a binder that has available free hydroxyl groups is reacted with an isocyanate or isocyanurate as post-crosslinking compound. In particular an hydroxyl-group-containing polyurethane is used as binder. These polyurethanes may, as previously mentioned, be present based on TDI, MDI, HMDI and/or HDI; they are preferably based on HDI.

The crosslinking according to the invention of the OH-containing binders with the post-crosslinking compound also leads to an increase in the corrosion protection of the obtained coating. The free hydroxyl groups on the other hand often have a corrosion-promoting effect. After the crosslinking no free or virtually no free OH groups are present any longer, and accordingly their corrosion-promoting action is eliminated. A larger proportion of OH groups could adversely affect the corrosion resistance to some extent.

Actinic radiation is understood to mean radiation whose frequencies or energy are suitable or sufficient for the activation of the polymerisation initiator (=photoinitiator). The radiation should normally have at least the energy or the frequency of visible light or UV light. Short wavelength visible and/or ultraviolet light (UV light) is preferred. Any radiation of shorter wavelength, i.e. higher energy, is of course also suitable. Electron beam radiation for example may also be used in cases where the use of a photoinitiator is not necessary.

Suitable as compounds that form free radicals under the action of radiation, in particular photoinitiators, are above all those compounds that exhibit a strong absorption in the spectral range of the employed radiation, in particular the near ultraviolet or short-wavelength visible light, i.e. approximately in the wavelength range from 180 to 700 nm. Especially suitable are aromatic carbonyl compounds and their derivatives, such as quinones, ketones and their ketals, for example benzyldimethyl ketal, benzoin, substituted benzoins and benzoin ethers, α-aminoketones; in addition polynuclear heterocyclic compounds such as acridines, phenazines and their substitution products as well as substituted phosphine oxides such as for example bisacylphosphine oxides. Several photoinitiators may be added at the same time, which for example specifically react at different wavelengths of the UV radiation.

A further important constituent is the at least one electrically conducting substance, which is preferably water-insoluble, such as for example inorganic pigment, in particular corrosion prevention or rust prevention pigment, for example in the form of oxides, phosphides and/or phosphates, in each case of aluminium, iron, copper, manganese, molybdenum and/or their mixtures or their combined compounds such as for example double oxides and/or other electrically conducting pigments such as for example graphite and/or graphite-mica pigments. Iron phosphide and/or magnetic iron oxide, in particular based on $Fe_3O_4$, are preferred. Graphite may in this connection also act as a dry lubricant. Magnetic iron oxide has a very high electrical conductivity. The higher the electrical conductivity of a pigment, the lower may be its proportion in the coating mixture or in the polymeric coating, without reducing the weldability. The at least one electrically conducting substance, in particular at least one pigment, may be used alone or as a mixture. The pigment does not have to be coloured, grey or black, and may also be colourless or white or have a slight colour effect. The at least one electrically conducting substance is preferably present in the form of particles, in particular elongated or platelet-shaped particles, optionally in the form of crystals, crystal aggregates or agglomerates. The mean size of the particles before mixing into the coating mixture is preferably in the range from 10 nm to 20 µm, particularly preferably above 30 nm and below 12 µm, most particularly preferably above 60 nm and below 10 µm, especially above 0.1 µm and below 8 µm. Even though the preferred thickness of the hardened dry film layer is often only in the range from 3 to 9 µm, the electrically conducting particles may have a mean particle size and/or a maximum particle size, in each case measured under a scanning electron microscope, that is greater than the average dry film layer thickness of the hardened layer.

Instead of or in addition to at least one inorganic pigment there may also be used electrically conducting polymers, such as for example polyanilines.

Additives meeting a very wide range of tasks or having very widely differing compositions may be employed. The proportion of additives apart from free-radically polymerisable binders, post-crosslinking binders, electrically conducting pigments, water and optionally organic solvent may comprise 0.5 to 50 wt. % referred to the composition of the wet paint including the liquids, and may preferably comprise 2 to 20 wt. %.

Finely particulate powder qualities such as for example hydrophobic silicic acid may serve to stabilise the suspension, which on account of the high pigment content can easily tend to settle out, and can help to flocculate floor sediment in vessels so that the floor sediment does not become encrusted and can easily be dissolved.

Additions of anticorrosion pigments such as for example based on oxide, phosphate and/or silicate or based on their alkaline earth, iron, manganese, silicon and zinc compounds, in particular based on calcium compounds, may intensify the corrosion protection.

Additives such as for example those based on silane or siloxane may improve the surface quality of the coating since they promote the slideability of the coating. They may in addition intensify the hydrophobicity of the mixture and act as defoaming agents, in order to prevent the formation of micropores, and may thereby contribute to the formation of a coating that is as pore-free as possible together with a coating surface that is as pore-free as possible and thus sealed.

In order to prevent a premature polymerisation of the coating mixtures these often contain small amounts of polymerisation inhibitors, for example hydroquinone and its derivatives and tert.-butylphenols. Such inhibitors are often already contained in the commercially available polymerisable compounds.

If the polymeric coating is not heated either during production or during further processing and is also not heated in use to temperatures above about 50° C., above 80° C. or above 110° C.—the softening point or melting point of the respective wax—and if the coating is not thereby adversely affected as regards the bondability for the processing use or intended use, then wax, in particular a polyethylene wax, may also be added, which can serve as a forming aid.

The mixtures normally contain in addition coating auxiliaries, for example surface-active substances, in particular polysiloxanes, silanes and/or silicon-free oligomeric and/or polymeric surfactants. They may furthermore contain defoaming agents, coupling agents, catalysts, corrosion inhibitors, pigments to increase the corrosion resistance and optionally also dyes and/or dye pigments.

An addition of layer compounds such as for example layer silicates may help to reduce or suppress the flow of hydrogen ions to the metallic surface, which promotes the corrosion protection.

The quantitative proportions of the constituents of the coating mixture may lie within the following ranges:

The coating mixtures may be wholly or largely anhydrous if they contain an amount of organic solvent. If for example the mixture contains 1 or 5 wt. % water, a content of organic solvent in the range from 20 to 40 wt. % is preferred. If for example the mixture contains 8 wt. % of water, a content of organic solvent in the range from 15 to 35 wt. % is preferred.

Water is contained in general in the range from 10 to 50 wt. %, preferably in the range from 15 to 40 wt. % and in particular in the range from 20 to 30 wt. %.

Organic solvent(s) is/are contained generally in the range from 0 to 50 wt. %, preferably in the range from 1 to 30 wt. % and in particular in the range from 2 to 12 wt. %, calculated here with reference to the content of water in the mixture.

Binder is generally contained in the range from 10 to 30 wt. %, preferably in the range from 15 to 25 wt. % and in particular in the range from 17 to 23 wt. %.

Electrically conducting substances such as for example pigment(s) is/are generally contained in the range from 30 to 75 wt. %, preferably in the range from 35 to 60 wt. %, in particular in the range from 40 to 48 wt. %. The contents of electrically conducting pigments may, like the contents of those based on magnetic iron oxide, iron phosphide and/or graphite, also be more than 50 wt. %. The contents of graphite and iron phosphide may preferably be 25 to 70 wt. %, particularly preferably at least 28 up to 65 wt. % and especially at least 30.45 up to 62.5 wt. %. The contents of graphite, magnetic iron oxide and iron phosphide may preferably be 25 to 70 wt. %, particularly preferably at least 30 or up to 65 wt. % and especially 35 to 62.5 wt. %. The ratio of the proportion of magnetic iron oxide to iron phosphide is preferably up to 15.4 wt. %. The ratio of graphite to iron-oxide is preferably up to 3.08 wt. %.

Post-crosslinking compound(s) is/are generally contained in the range from 1 to 20 wt. %, preferably in the range from 1 to 10 wt. % or 2 to 10 wt. %, especially in the range from 3 to 6 wt. %, in each case either only uncapped or only capped post-crosslinking compounds.

Photoinitiator(s) is/are generally contained in the range from 1 to 60 wt. %, preferably in the range from 2 to 24 wt. % and especially in the range from 2.5 to 3.5 wt. %. Wax(es) and/or wax-like substance(s) is/are generally contained in the range from 0 to 15 wt. %, preferably in the range from 0.5 to 10 wt. % and especially in the range from 1 to 6 wt. %.

Additive(s) is/are generally contained in the range from 0.01 to 5 wt. %, mostly in the range from 0.1 to 4 wt. %, preferably in the range from 0.3 to 3 wt. %, particularly preferably in the range from 0.5 to 2 wt. %. Corrosion protection pigment such as for example silicate pigment is preferably contained in an amount of up to 4 wt. %. The content of stabiliser such as for example hydrophobic silicic acid is preferably up to 0.5 wt. %.

The weight ratio of the electrically conducting substance(s) to the binders may be varied in particular in the range from 1:1 to 5:1, preferably in the range from 1.5:1 to 4:1. By increasing the proportion of the electrically conducting substance(s), which may vary within a wide range, the weldability can also be improved very substantially. In many cases however an optimisation of various properties of the resultant dry film, such as for example weldability, hardness, strength, elasticity, chemical resistance, formability, sliding behaviour, bondability, corrosion resistance and paint adhesion is chosen that is appropriate for most or all properties.

The coating mixtures are generally produced by grinding or mixing water-insoluble pigment particles with the remaining water-soluble, water-dilutable or water-dispersible constituents to form an homogeneous, low viscosity composition. The grinding may be carried out as homogeneous intermixing, for example in a bead mill, in which for instance a binder/water mixture, which may also contain organic solvent, is mixed with the pigments. The viscosity should be in a range that permits a uniform application to form a thin, for example 5 to 25 μm, preferably 6 to 22 μm and particularly preferably 10 to 20 μm thick layer of the liquid coating mixture. When this liquid film is dried a dry film layer is formed whose thickness is in the range from 0.5 to 15 μm, preferably in the range from 1 to 10 μm, particularly preferably in the range from 2 to 8 μm and especially in the range from 3 to 7 μm. In the determination of this layer thickness the tips of the pigment particles that often project from the polymeric composition are largely disregarded. The dry film layer thickness is preferably determined gravimetrically (layer weight determination) or by a β particle backscattering method.

The binder mixture must have a viscosity suitable for coating. This is also necessary in order to be able to apply uniformly the desired very thin coating layer thicknesses with as slight thickness variations as possible. The viscosity of the coating mixture containing the particles is preferably in the range from 100 to 1000 MPa·s at 25° C.

The viscosity can be adjusted by the choice of the type and amount of particularly the binder and water. The viscosity is generally in the range from 200 to 6000 MPa·s, in particular in the range from 500 to 5000 MPa·s, measured at 25° C. without particle content. If the viscosity of the particle-free coating mixture is too high, the liquid film that is formed is too thick, whereas if it is too low the liquid film runs off and also cannot be properly applied with a so-called roll coater.

The metallic substrate to be coated is preferably a strip or a sheet, which in many cases consists substantially of steel, galvanised or AlZn-coated steel or an aluminium alloy, and has a thickness of the metallic substrate in the range from 0.15 to 10 mm, especially from about 0.2 to 1.6 mm.

In particular a strip, a sheet or a panel is used that is suitable for the production of for example automobile components. The coating according to the invention may be applied in a conventional way. For this purpose a polymeric surface must be extremely clean. In addition the metallic surface of for example a strip is normally for this purpose electrolytically coated or hot-dip galvanised beforehand and then pretreated with an aqueous pretreatment solution, wherein this pretreatment has hitherto frequently involved a chromating and/or phosphating. If no zinc-containing alloy is applied or if this metallic coating is no longer freshly applied for the pretreatment, it is recommended to carry out a cleaning, pickling and/or activation before the coating with the pretreatment solution. It is however preferred for the pretreatment solution to be largely or wholly free of chromium. It is furthermore preferred if the pretreatment solution is largely or wholly free of cobalt, copper and/or nickel or even free of all types of heavy metals. Metallic substrates that have not been pretreated may also be employed. The weldable coating is then applied according to the invention to this optionally pretreated surface.

As regards the points to be through-contacted in the welding, it should be borne in mind that at least 2, 3 or even 4 polymeric coatings have to be through-contacted in the weld contact. The thicker the individual polymeric layers, the better the electrical conductivity of these layers has to be in order to permit a good through-contacting and ensure a longer service life of the welding electrodes. For this reason with for example four polymeric coatings on two metal sheets it has a significant effect on the electric resistance when welding whether the individual coatings comprise a layer thickness of only 4 or of 8 μm. In addition the metal sheets as well as the metallic coatings on the layers and possibly also thicker pretreatment layers may contribute significantly in increasing the electric resistance of the two superimposed coated metal sheets.

In general the strip or metal sheet is wound in the form of rolls, so-called coils. In order to apply the coating according to the invention a coil is if necessary unwound and, after having been coated, is rewound again into a coil. Coatings are conveniently applied in a continuous process. With the coating mixture according to the invention it is however also possible to operate according to the so-called inline process. The strip or metal sheet is normally electrolytically galvanised or hot-dip galvanised in the production line and is next pretreated, for example chromated and/or phosphated, following which it can then be coated according to the invention. The strip is wound into a coil only after it has undergone polymeric coating. Obviously a non-pretreated metallic material can also be coated according to the invention.

In the coating process according to the invention the metallic strip passes for example through a coating station and then through at least one hardening station. The coating may be effected by spraying, for example through slit-shaped jets, by sprinkling, by dipping and/or by roller application. Roller coating is generally preferred. The polymeric coating is preferably carried out at room temperature or at a temperature slightly above room temperature, i.e. at temperatures in the range from about 20° to 40° C., the material and the substrate surface preferably having a temperature in the range from 20° to 30° C. The mixture is preferably applied so that the resulting dry film layer thickness is in the range from 3 to 12 μm, in particular in the range from 4 to 10 μm.

After the coating the water can be evaporated in a circulating air oven, generally at a substrate temperature of 30° to 80° C., preferably 40° to 60° C., which however depends in particular on the substrate thickness. The drying may be carried out for a time generally ranging from 1 to 30 seconds, preferably from 3 to 20 seconds and particularly preferably from 5 to 15 seconds, in order to allow the subsequent UV hardening. If the strip is fed more quickly, then a higher substrate temperature is normally necessary. The process according to the invention may on account of the only partial crosslinking with actinic radiation be carried out rather more quickly than is normally the case, for example at a rate of at least 75 m/min or even at least 125 m/min.

After the evaporation the hardening takes place, preferably during passage through a hardening station. There the strip is fed, optionally under an inert gas atmosphere such as for example nitrogen, at a distance of a few centimeters underneath a radiation source, which preferably corresponds approximately to the overall width of the strip. The strip speed may be chosen in particular depending on the layer thickness, light sensitivity of the layer, distance of the lamp from the layer and lamp output. The speed may furthermore be dependent on whether the irradiation is carried out in air or alternatively in nitrogen. The strip speed may if desired be increased by installing two or more radiation sources in series. Strip speeds of up to about 200 m/min can be achieved with the mixture according to the invention. Preferred strip speeds are currently generally in the range from 80 to 140 m/min.

UV light sources such as gas discharge lamps, xenon lamps or sodium vapour lamps are preferably used as radiation sources, whose emission maxima lie in the spectral range from about 180 to 700 nm, in particular in the range from 200 to 600 nm, and which have a lamp output of 160 to 240 watt/cm. Lamps that emit substantially in the short wavelength visible spectrum from about 400 nm to 550 nm may also be used. In principle, radiation of higher energy, for example electron beam radiation, may also be employed for the hardening. The actinic irradiation, like the coating process, is preferably carried out at ambient temperatures that are not or are not significantly above room temperature, i.e. generally not above about 50° C. The irradiated layer surface often reaches temperatures in the range from 60° up to about 80° C. due to the UV excitation, which includes an IR radiation component.

With substrate temperatures of in general 30° to 80° C., preferably 40° to 60° C., the post-crosslinking according to the invention additionally takes place. Preferably the actinic hardening accounts for 40% to 80% of the crosslinking. Layers that are particularly anticorrosive, firmly adherent and extremely formable are produced by the combination of actinic hardening and the predominantly chemical post-crosslinking.

The layer composition and the hardening conditions should be chosen so that a hard, solid, corrosion-resistant layer is formed, which however is sufficiently viscoplastic so that a forming of the substrate, for example of the steel sheet, is possible without causing embrittlement cracks in the anticorrosion layer. The layer is outstandingly suitable for bonding or welding to other parts. The coating mixture may be designated as a welding primer.

The production of the anticorrosion layer by the process according to the invention permits a wide variation of the layer thickness within the range specified above. The layer adheres firmly and permanently to the substrate; it may be painted over in a conventional way, for example by cathodic dip coating, and has a smooth, slideable surface.

With a thickness of the hardened layer in the range from 3 to 12 μm, preferably in the range from 4 to 10 μm, more or fewer than about 1000 welding points per electrode pair are obtained, depending on the nature of the metallic substrate, particularly in the welding region of about 1.5 kA, depending on the nature of the metallic substrate, before the electrode has to be replaced or re-milled. In this connection the hardened dry film should have an electrical resistance that is as far as possible less than 250μΩ.

The corrosion-protected metal sheets obtained according to the invention (coil-coated steel) are then transported to the further processing plant, as a rule an automobile manufacturer, where they may be temporarily stored.

The metal sheets are uncoiled again and, depending on requirements, are stamped, formed and welded or bonded. On account of the properties of the coating mixture according to the invention a very good formability, both with as well as without the use of drawing oil, and a very good weldability are achieved. After coating has been performed the parts are processed further as required, for example cleaned with an alkaline agent and further coated, for example by cathodic dip coating. Following this the metal sheet coated in this way or a subassembly coated in this way can for example be treated with a filler and then painted with a topcoat.

The mixture according to the invention permits the incorporation of high pigment concentrations into the coatings obtainable therefrom. This is often not possible with conventional polymeric mixtures at this strip speed. Due to the large proportion of electrically conducting pigments or electrically conducting polymers, a good weldability is achieved also with high layer thicknesses. This is advantageous particularly when coating chromate-free pretreated metallic substrates, for example steel strips and sheets. The coating mixtures according to the invention are therefore particularly suitable for the coating of steel strips and sheets that have been electrolytically galvanised or hot-dip galvanised and preferably pretreated in a chromate-free manner, but have possibly also not been galvanised. Furthermore the mixtures according to the invention permit, due to the post-crosslinking, a high strip speed in the coating of the metallic substrate.

Due to the increased amount of a post-crosslinking instead of simply actinic hardening the installation of additional UV lamps may also be unnecessary in the process according to the invention, which are otherwise often installed in order to achieve high or even higher strip speeds. Large savings in investment costs can thereby be achieved. Also, the energy balance is more favourable on account of the content of post-crosslinking compounds. Despite a further increased strip speed, the process according to the invention can be operated with approximately constant energy, material and process costs. Due to the increased amount of a post-crosslinking instead of simply actinic hardening, far larger dry film layer thicknesses can also be through-hardened by the process according to the invention, despite high strip speeds. This is enhanced still further by the fact that the proportion of the oligomers of polymers that are to be crosslinked is relatively slight, particularly on account of a high proportion of electrically conducting substance(s), and also on account of a comparatively minor actinic radiation output.

The object of the invention is also achieved by a process for the hardening of a polymer layer which, on account of the high pigment content and its layer thickness, cannot be irradiated with actinic radiation through its whole layer thickness and therefore cannot be through-hardened by actinic radiation alone, wherein a UV hardening is followed by a chemical post-crosslinking, which may optionally be accelerated or intensified by the action of heat, the polymer layers being largely or wholly through-hardened. The through-hardening layer thickness may in this connection be at least 5 μm and in particular up to 200 μm. The content of pigments may be at least 16 wt. %, preferably at least 24 wt. %, in particular at least 32 wt. %, referred to the composition of the wet paint.

On account of the combination of UV hardening with chemical hardening, which may optionally be accelerated or intensified by the action of heat, it is possible to through-harden completely or substantially over their whole volume coatings which, on account of the high pigment content of the polymer coating and on account of its layer thickness, can no longer be irradiated through the whole layer thickness with UV radiation and therefore also cannot be through-hardened. The more strongly the polymer layer absorbs the actinic radiation, in particular UV radiation, which may be associated with the content of pigment particles, the greater the need for chemical post-crosslinking. This applies in a corresponding way the thicker the polymer layer. Accordingly polymer coatings with a layer thickness in the range from 5 to 200 μm can now be hardened, which otherwise can only be partially hardened with actinic radiation without chemical post-crosslinking.

On account of the high degree of crosslinking the coating mixture according to the invention exhibits, after the hardening, an improved resistance to corrosive media such as for example salt solutions and to alkalis, and in particular on account of the isocyanate/isocyanurate system an improved resistance to organic solvents. The dry film hardened according to the invention has a very high corrosion resistance also with low layer thicknesses. It exhibits a very good bondability between the polymer-coated surfaces.

It appears that with this chemical system a weldable primer has been developed for the first time that can be successfully used in mass production, in particular in high-speed strip plants.

Surprisingly the need for UV radiation could already be reduced in initial trials by 30 to 40% and subsequently by 60 to 70% by the use of post-crosslinking compounds. This indicates the high potential for reducing the strip speed. At the same time the hardened dry film exhibits a high ductility, even though it was not primarily designed for forming operations.

The metallic or polymeric substrates coated according to the invention may be used in particular in the automobile, aircraft and aerospace industries, in building and construction, for external linings, roof linings and in internal construction, in mechanical engineering and apparatus construction, for cabinet elements, shelving and domestic appliances.

According to the invention a wire, strip or part can be coated, wherein the substrate to be coated is preferably a wire, a wire coil, a wire mesh, a steel strip, a metal sheet, a cladding/lining, a screening, a car body or a part of a car body, a part of a vehicle, trailer, mobile home or missile, a covering, a housing, a lamp, a light, a hanging light unit, an item of furniture or furniture part, a component of a domestic appliance, a frame, a profiled section, a moulded part of complicated geometry, a beam barrier, radiator or sauna part, an automobile bumper, a part made of or with at least one pipe and/or a profiled section, a window, door or bicycle frame, or a small part such as for example a screw, nut, flange, spring or a spectacle frame.

EXAMPLES AND COMPARISON EXAMPLES

The following examples, which are reproduced in the tables, illustrate preferred embodiments of the process according to the invention.

When formulating a composition the free-radically hardening compound was first of all taken. All further additives were then added in a premixed state (3. to 7.) and stirred. The pigments (8. to 11.) as well as the stabiliser for the suspension (12.) were then stirred in and dispersed with a high-speed stirrer. This mixture was then ground in a bead mill to a fineness of 5 to 20 μm. Finally the viscosity was adjusted with a small addition of fully deionised water. If necessary the pH was adjusted to the necessary value in the range from 8 to 9 by adding ammonia. Following this the mixture was passed through a screen of 40 μm mesh width. The post-crosslinking compound (2.) was in each case added directly to this mixture before the processing stage.

The application of the ready-for-use mixture provided with the post-crosslinking compound was carried out on a chromate-free hot-dip galvanised steel sheet pretreated with zirconium hexafluoride, using a 7 μm doctor blade. The water content was evaporated at 60° C. over 10 to 15 seconds and the film was then UV hardened with a UV-CK1 lamp and a UV-CK lamp at a strip speed of 40 m/min and at 160 W/cm lamp output per lamp. The layer thicknesses of the UV-hardened coatings were in the range from 2 to 10 μm. The post-crosslinking, which apart from the examples involving capped post-crosslinking compounds took place immediately under the thermal influence of the UV radiation, was not accelerated by additional thermal energy. The post-crosslinking of the coating occurred in an intensified manner during the cooling of the metal sheets over ca. 24 hours, during which the substrate temperature was above 40° C. After 2 days the post-crosslinking was substantially complete. After this time the metal sheets coated in this way were still not completely hardened. After storage for more than 10 days the metal sheets treated according to the invention were almost completely crosslinked and exhibited the properties shown in Tables 2 and 3. The calculations are based on the composition of the wet paint and therefore include water and possibly also organic solvent in the composition calculated as 100 wt. %. The dry film layer thickness was determined gravimetrically.

TABLE 1

Composition of the mixtures of examples according to the invention (B) and comparison examples (VB) with data in weight percent

| | Example or Comparison Example | | | | | | | | | |
|---|---|---|---|---|---|---|---|---|---|---|
| | B 1 | B 2 | B 3 | B 4 | B 5 | B 6 | B 7 | B 8 | VB 1 | VB 1 |
| 1. 42.5% polyurethane dispersion in water, free-radical hardening | 43.18 | 40.91 | 47.73 | 47.73 | 37.50 | 35.00 | 30.00 | 32.50 | 55.00 | 30.00 |
| 2. Polyfunctional isocyanurate based on HDI (post-crosslinking) | 4.54 | 4.54 | 4.54 | 4.54 | 4.00 | 4.00 | 3.00 | 4.00* capped | — | — |
| 3. 1-hydroxycyclohexyl phenyl ketone | 2.27 | 2.27 | 2.27 | 2.27 | 2.00 | 2.00 | 1.50 | 2.00 | 2.50 | 2.50 |
| 4. Bis(2,6-dimethoxybenzoyl)-2,4,4-trimethylpentylphosphine oxide | 0.45 | 0.45 | 0.45 | 0.45 | 1.00 | 1.00 | 0.90 | 1.00 | 0.50 | 0.90 |
| 5. Dipropylene glycol monomethyl ether | 1.82 | 1.82 | 1.82 | 1.82 | 2.00 | 1.40 | 0.25 | 1.40 | 2.00 | 2.00 |
| 6. Polyethylene-modified polydimethylsiloxane | 0.45 | 0.45 | 0.45 | 0.45 | 0.50 | 0.50 | 0.25 | 0.50 | 0.50 | 0.25 |
| 7. Polyether-modified acrylic-functional polydimethylsiloxane | 0.45 | 0.45 | 0.45 | 0.45 | 0.10 | 0.10 | 0.10 | 0.10 | 0.50 | 0.10 |
| 8. Iron phosphide | 36.36 | 38.64 | 29.55 | 32.73 | 50.00 | 54.00 | 62.50 | 55.00 | 35.00 | 60.00 |
| 9. Magnetic iron oxide | 4.54 | 4.54 | 4.54 | 4.54 | — | — | — | — | 2.50 | 2.50 |
| 10. Silicate pigment modified with calcium ions | 1.36 | 1.36 | 1.82 | — | 2.00 | 2.00 | 1.50 | 2.00 | — | — |
| 11. Graphite | 0.91 | 0.91 | 0.91 | — | — | — | — | 0.50 | — | — |
| 12. Hydrophobic silicic acid | 0.23 | 0.23 | 0.23 | 0.23 | — | — | — | — | 0.25 | 0.25 |
| 13. Water, added separately | 3.41 | 3.41 | 5.23 | 4.77 | 0.90 | — | — | 1.00 | 1.25 | 1.50 |

*Identical isocyanurate as in Examples B1 to B7, but in addition capped

TABLE 2

Properties of the coatings according to the invention with variations in the layer composition

| Properties | B 1 | B 2 | B 3 | B 4 | B 5 | B 6 | B 7 | B 8 | VB 1 | VB 1 |
|---|---|---|---|---|---|---|---|---|---|---|
| Dry film thickness in μm | 6 | 6 | 6 | 6 | 6 | 6 | 6 | 6 | 6 | 6 |
| Elasticity of the coating in mm: cupping test according to DIN EN ISO 1520 | 7.6 | 7.8 | 9.2 | 8.8 | 7.4 | 7.0 | 6.5 | 7.4 | 7.3 | 6.0 |
| Compression strength of the coating (Buchholz hardness) | low | low | low | low | high | very high | very high | high | Low | high |
| Hardness of the coating | low | low | low | low | high | very high | very high | high | Low | high |
| Formability on bending over an edge | good | good | good | good | average | average to poor | poor | good | good | poor |
| Defects after forming on bending over an edge | crack-free | crack-free | crack-free | crack-free | slight cracks | marked cracks | cracks | slight cracks | crack-free | cracks |
| Electrical conductivity of the coating | low | Low | very low | low | average | average | high | average | Low | very high |
| Bonding properties, visually judged by the Schäl test with epoxide resin bonder: adhesion-cohesion fracture | 50:50 | 50:50 | 50:50 | 55:45 | 70:30 | 75:25 | 85:15 | 60:40 | 60:40 | 90:10 |
| Salt spray test according to DIN 50021 SS, flat sample after 500 hours | unchanged | unchanged | unchanged | marked white rust | slight white rust | marked white rust | marked white rust | slight white rust | marked white rust | marked white rust |
| Salt spray test according to DIN 50021 SS, flat sample after 1000 hours | average white rust | average white rust | slight white rust | marked red rust | slight white rust | some red rust | some red rust | slight white rust | some red rust | marked red rust |

TABLE 2-continued

Properties of the coatings according to the invention with variations in the layer composition

| Properties | B 1 | B 2 | B 3 | B 4 | B 5 | B 6 | B 7 | B 8 | VB 1 | VB 1 |
|---|---|---|---|---|---|---|---|---|---|---|
| Paint adhesion after corrosion protection with adhesive strip | slight peeling | slight peeling | slight peeling | marked peeling | slight peeling | slight peeling | slight peeling | slight peeling | marked peeling | marked peeling |
| Resistance to alkaline cleaning agents | very good | very good | very good | good | good | adequate | satisfactory | good | unsatisfactory | unsatisfactory |

TABLE 3

Properties of the coatings according to the invention with variations in dry film thickness and proportions of crosslinking agent

| Properties | B 9 | B 10 | B 11 | B 12 | B 13 | B 14 |
|---|---|---|---|---|---|---|
| Composition | Mixture acc. to B3 | | | Mixture acc. to B7 | | |
| Dry film thickness in μm | 2 | 6 | 10 | 2 | 6 | 10 |
| Propn. electrically conducting particles, % | 37.5 | 37.5 | 37.5 | 62.5 | 62.5 | 62.5 |
| Propn. UV hardening, % | 80 | 80 | 80 | 80 | 80 | 80 |
| Propn. of post-cross-linking, % | 20 | 20 | 20 | 20 | 20 | 20 |
| Elasticity of the coating in mm: cupping test according to DIN EN ISO 1520 | 9.6 | 9.2 | 7.1 | 7.2 | 6.5 | 4.9 |
| Compression strength of the coating (Buchholz hardness) | low | low | Low | very high | very high | very high |
| Hardness of the coating | low | low | Low | very high | very high | very high |
| Formability on bending over an edge | very good | good | Satisfactory | good | poor | poor |
| Defects after forming on bending over an edge | crack-free | crack-free | slight cracks | crack-free | cracks | Cracks |
| Electrical conductivity of the coating | high | very low | very low | very high | high | High |
| Bonding properties, visually judged by the Schäl test with epoxide resin bonder: adhesion-cohesion fracture | 50:50 | 50:50 | 60:40 | 70:30 | 85:15 | 85:15 |
| Salt spray test according to DIN 50021 SS, flat sample after 500 hours | slight white rust | unchanged | Unchanged | marked white rust | marked white | unchanged |
| Salt spray test according to DIN 50021 SS, flat sample after 1000 hours | some red rust | slight white rust | Unchanged | some red rust | some red rust | some white rust |
| Paint adhesion after corrosion protection with adhesive strip | slight peeling | slight peeling | No peeling | slight peeling | slight peeling | slight peeling |
| Resistance to alkaline cleaning agents | very good | very good | very good | satisfactory | satisfactory | satisfactory |

| Properties | B 15 | B 16 | B 17 | B 18 | B 19 | B 20 |
|---|---|---|---|---|---|---|
| Composition | Mixture acc. to B3 | | | Mixture acc. to B7 | | |
| Dry film thickness in μm | 6 | 6 | 6 | 6 | 6 | 6 |
| Propn. electrically conducting particles, % | 37.5 | 37.5 | 37.5 | 62.5 | 62.5 | 62.5 |
| Propn. UV hardening, % | 40 | 60 | 70 | 40 | 60 | 70 |
| Propn. of post-cross-linking, % | 60 | 40 | 30 | 60 | 40 | 30 |
| Elasticity of the coating in mm: cupping test according to DIN EN ISO 1520 | 8.6 | 9.0 | 9.1 | 5.4 | 6.1 | 6.5 |
| Compression strength of the coating (Buchholz hardness) | high | high | fairly low | extremely high | extremely high | very high |
| Hardness of the coating | high | high | fairly low | extremely high | extremely high | very high |
| Formability on bending over an edge | good | good | good | poor | Poor | poor |
| Defects after forming on bending over an edge | slight cracks | crack-free | crack-free | marked cracks | marked cracks | cracks |
| Electrical conductivity of the coating | very low | very low | very low | high | High | high |
| Bonding properties, visually judged by the Schäl test with epoxide resin bonder: adhesion-cohesion fracture | 50:50 | 50:50 | 50:50 | 50:50 | 60:40 | 85:15 |
| Salt spray test according to DIN 50021 SS, flat sample after 500 hours | unchanged | unchanged | unchanged | unchanged | unchanged | slight white rust |

TABLE 3-continued

Properties of the coatings according to the invention with variations in dry film thickness and proportions of crosslinking agent

| Salt spray test according to DIN 50021 SS, flat sample after 1000 hours | slight white rust | slight white rust | slight white rust | unchanged | unchanged | marked white rust |
|---|---|---|---|---|---|---|
| Paint adhesion after corrosion protection with adhesive strip | slight peeling | slight peeling | slight peeling | no peeling | no peeling | slight peeling |
| Resistance to alkaline cleaning agents | extremely good | extremely good | very good | very good | good | good |

The composition of Example 3 showed, in proportion to the content of polyurethane dispersion and on account of a content of anticorrosion pigment (silicate pigment), the best anticorrosion results. In addition Example 7 showed, on account of the largest proportion of electrically conducting pigments (iron phosphide, magnetic iron oxide or graphite), the best electrical conductivity of the applied coating and therefore also the best suitability for welding. In comparison example 1 no post-crosslinking compound was added, with the result that the alkaline resistance was worst since free OH and polyol groups were still present in the dried film. Although comparison example 2 shows the highest electrical conductivity and thus the best suitability for welding, it also has the worst values as regards chemical resistance and weldability.

In the examples of Table 3 the chemical composition of the Examples B.3 and B.7 were varied, on the one hand as regards the dry film layer thickness and on the other hand as regards the proportion of the components that are responsible for the UV hardening or alternatively for the post-crosslinking. For Examples B.15 to B.20, which are based only partially on the composition of Examples B.3 and B.7, the proportion of the various types of crosslinking was varied by altering the proportions of free-radically polymerisable binders, post-crosslinking compound and photoinitiators proportionally to the proportion of the crosslinking in which they are involved. With increasing dry film thickness the welding suitability was significantly reduced though the corrosion protection was significantly improved (Table 3). With increasing proportion of UV crosslinking the compression strength and hardness of the coating can be improved, though the corrosion protection was reduced somewhat. Nevertheless the elasticity remained in the desired ranges.

In addition to the tests given in Tables 2 and 3 and their results, an MEK test was also carried out on the degree of crosslinking after the second day, after substantially complete hardening. Whereas in the case of the metal sheets coated with the mixtures according to Examples 1 to 4 about 40 double strokes with a cloth impregnated with methyl ethyl ketone were required and in the Examples 5 to 8 in each case 25 to 30 double strokes were required in order to remove the coating, in the case of the coating according to comparison examples 1 and 2 removal of the coating was observed already after 5 to 10 double strokes.

In the salt spray mist test according to DIN 50021 over 500 and 1000 hours, a very good corrosion resistance was observed in the metal sheets coated with the mixtures according to the invention.

The invention claimed is:

1. A mixture for the application of a polymeric coating to a substrate comprising: water,
at least one water-dispersible free-radically polymerizable compound
at least one water-dispersible post-crosslinking compound;
at least one water-dispersible compound that forms free radicals when irradiated with actinic radiation, wherein the free-radically polymerizable compound does not completely harden at room temperature with the free radicals formed by the actinic radiation and contains reactive bonds that in contact with the post-crosslinking compound lead to a major or complete hardening; and
at least one substance selected from the group consisting of an electrically conductive substance and waxes and a sufficient amount of silane or siloxane to promote the slideability of the coating, wherein the mixture comprises 10 to 50 wt. % water; 10 to 30 wt. % binder; 30 to 55 wt. % of at least one electrically conducting substance; 1 to 20 wt. % of a post-crosslinking compound; and 1 to 60 wt. % of at least one photoinitiator; calculated as composition of the mixture.

2. A mixture for the application of an anticorrosion layer to a metallic substrate, said mixture containing water, optionally an organic solvent;
at least one free-radically polymerizable binder;
at least one compound forming free radicals when irradiated with actinic radiation; at least one electrically conducting substance;
at least one post-crosslinking compound; and at least one wax.

3. A mixture according to claim 1, wherein free-radically polymerizable binder is water-dispersible and is selected from the group consisting of acrylates, methacrylates, epoxy resins, polyurethanes and polyesters, preferably from epoxy acrylates, urethane acrylates and acrylic-containing polyesters, in particular from epoxy acrylates, urethane acrylates and acrylic-containing polyesters that comprise free OH groups.

4. A mixture according to claim 1, comprising at least one free-radically polymerizable compound that comprises at least one free OH or polyol groups.

5. A mixture according to claim 1, wherein the free-radically polymerizable binder comprises at least one group that is ethylenically, methylenically or propylenically unsaturated and is derived from a α-, β-unsaturated carboxylic acids.

6. A mixture according to claim 1, wherein the post-crosslinking compound is selected from the group consisting of a water-soluble isocyanate, a water-soluble isocyanarate, a water-dilutable isocyanate, a water-dilutable isocyanarate, a water-dispersible isocyanate or isocyanurate based on TDI, MDI, HMDI or HDI, in particular based on HDI.

7. A mixture according to claim 1, wherein the at least one post-crosslinking compound is selected from the group consisting of an isocyanate or an isocyanurate and the free-radically polymerizable binder is a urethane acrylate comprising hydroxyl groups.

8. A mixture according to claim 1, wherein said electrically conducting pigment comprises at least one material selected from the group consisting of a phosphide, phosphate or oxide of aluminum, iron, copper, or manganese, molybdenum-graphite, graphite-mica and magnetic iron oxide.

9. A mixture according to claim 1, wherein said electrically conducting particles have at least one of a mean particle size or a maximum particle size as measured under a scanning electron microscope that is greater than the average dry film layer thickness of the layer produced therewith after hardening.

10. A mixture according to claim 1, comprising 10 wt. % water; calculated as composition of the mixture.

11. A mixture for the application of a polymeric coating to a substrate comprising: water, at least one water-dispersible free-radically polymerizable compound
- at least one water-dispersible post-crosslinking compound;
- at least one water-dispersible compound that forms free radicals when irradiated with actinic radiation, wherein the free-radically polymerizable compound does not completely harden at room temperature with the free radicals formed by the actinic radiation and contains reactive bonds that in contact with the post-crosslinking compound lead to a major or complete hardening; and
- at least one substance selected from the group consisting of an electrically conductive substance and waxes and a sufficient amount of silane or siloxane to promote the slideability of the coating wherein said at least one substance is the electrically conductive substance.
- wherein the electrically conductive substance is present in an amount of from 30-75% by weight of the mixture.

12. A mixture for the application of an anticorrosions layer to a metallic substrate, said mixture comprising:
water,
at least one free-radically polymerizable binder;
at least one compound forming free radicals when irradiated with actinic radiation; at least one electrically conducting substance;
at least one post-crosslinking compound; and
at least one wax;
wherein the electrically conductive substance is present in an amount of from 30-75% by weight of the mixture.

13. A mixture for the application of a polymeric coating to a substrate comprising: water,
at least one water-dispersible free-radically polymerizable compound
at least one water-dispersible post-crosslinking compound;
at least one water-dispersible compound that forms free radicals when irradiated with actinic radiation, wherein the free-radically polymerizable compound does not completely harden at room temperature with the free radicals formed by the actinic radiation and contains reactive bonds that in contact with the post-crosslinking compound lead to a major or complete hardening; and
at least one substance selected from the group consisting of an electrically conductive substance and waxes and a sufficient amount of silane or siloxane to promote the slideability of the coating,
wherein said water-dispersible polymerizable post-crosslinking compound is selected from the group consisting of isocyanate, isocyanurate, melamine resin and compounds that release at least one of isocyanate and isocyanurate at an elevated temperature.

14. A mixture for the application of a polymeric coating to a substrate comprising: water,
at least one water-dispersible free-radically polymerizable compound
at least one water-dispersible post-crosslinking compound;
at least one water-dispersible compound that forms free radicals when irradiated with actinic radiation, wherein the free-radically polymerizable compound does not completely harden at room temperature with the free radicals formed by the actinic radiation and contains reactive bonds that in contact with the post-crosslinking compound lead to a major or complete hardening; and
at least one substance selected from the group consisting of an electrically conductive substance and at least one wax, wherein the mixture comprises 10 to 50 wt. % water; 10 to 30 wt. % binder; 30 to 55 wt. % of at least one electrically conducting substance; 1 to 20 wt. % of a post-crosslinking compound; and 1 to 60 wt. % of at least one photoinitiator; calculated as composition of the mixture.

15. A mixture for the application of a polymeric coating to a substrate comprising: water,
at least one water-dispersible free-radically polymerizable compound
at least one water-dispersible post-crosslinking compound;
at least one water-dispersible compound that forms free radicals when irradiated with actinic radiation, wherein the free-radically polymerizable compound does not completely harden at room temperature with the free radicals formed by the actinic radiation and contains reactive bonds that in contact with the post-crosslinking compound lead to a major or complete hardening; and
at least one substance selected from the group consisting of an electrically conductive substance and waxes and a sufficient amount of silane or siloxane to promote the slideability of the coating,
wherein said water-dispersible polymerizable post-crosslinking compound is selected from the group consisting of isocyanate, isocyanurate, melamine resin and compounds that release at least one of isocyanate and isocyanurate at an elevated temperature.

16. A mixture for the application of an anticorrosion layer to a metallic substrate, said mixture containing water, optionally an organic solvent;
at least one free-radically polymerizable binder;
at least one compound forming free radicals when irradiated with actinic radiation; at least one electrically conducting substance;
at least one post-crosslinking compound; and at least one wax wherein said water-dispersible polymerizable post-crosslinking compound is selected from the group consisting of isocyanate, isocyanurate, melamine resin and compounds that release at least one of isocyanate and isocyanurate at an elevated temperature.

* * * * *